Patented Aug. 18, 1942

2,293,311

UNITED STATES PATENT OFFICE 2,293,311

ELECTRICALLY DRIVEN GYROSCOPE

Hans Schuchardt, Berlin-Steglitz, Germany, assignor to Askania-Werke A. G. vormals Centralwerkstatt Dessau und Carl Bamberg-Friedenau, a corporation of Germany Application July 26, 1939, Serial No. 286,542
In Germany August 4, 1938

3 Claims. (Cl. 172—36)

This invention relates to an improvement in electrically driven gyroscopes.

An object of the invention is to increase the effectiveness of this character of gyroscope by reducing to a minimum the amount of air space between the armature and field magnet structure.

One of the features of the invention consists in providing a stator frame which will position the field magnet structure in exact coaxial relationship with the armature.

In attaining the object of the invention, considerable difficulty is encountered by reason of the fact that the rotor supporting frame of the gyroscope must also be rotatably mounted. This frame is usually constructed in the form of a closed two section ring. Heretofore, in order to insure the mounting of the field magnet structure, in alignment with the armature of the rotor, on the rotor frame or ring it was customary to divide the frame or ring in two sections, as noted, in order to facilitate the machining of the interior surfaces of the same.

A further object of the invention is to obviate the necessity of carrying out difficult machining operations on the interior surface of a divided rotor frame or ring.

Another feature of the invention resides in the employment of an integral rotor frame having a position defining exterior portion on which the stator frame is mounted.

A further feature of the invention consists in providing a ring-shaped mounting portion of the stator frame, the bore of which is adapted to fit on a machined outer surface portion of the integral rotor frame or ring.

In order to simplify the manufacturing process, it is advisable to cast or press the stator frame and then to machine the interior mounting surface thereon for the field magnet structure and the axially aligned bore in the mounting portion of the frame at the same time.

Other objects, features and structural details of the invention will be apparent from the following description when read in connection with the accompanying drawing, wherein.

Figure 1:
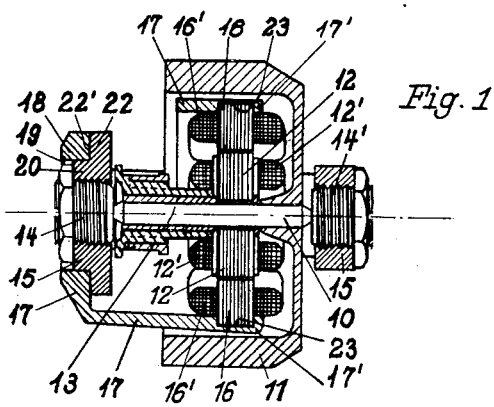
Fig. 1 shows the rotor structure, the rotor bearing frame and the stator frame of the gyroscope in a section view taken on line 1—1, in Fig. 2.
Figure 2:
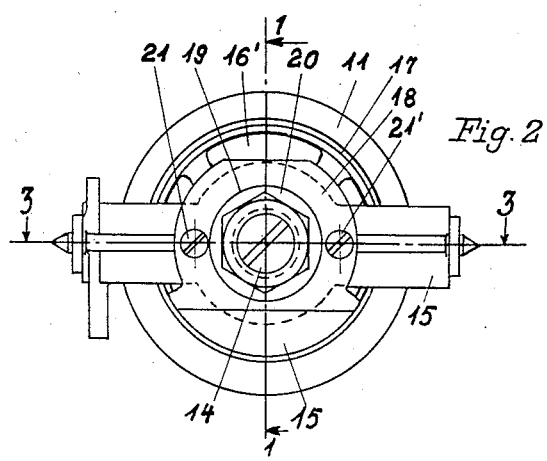
Fig. 2 is an end side elevation of the improved gyroscope.
Figure 3:
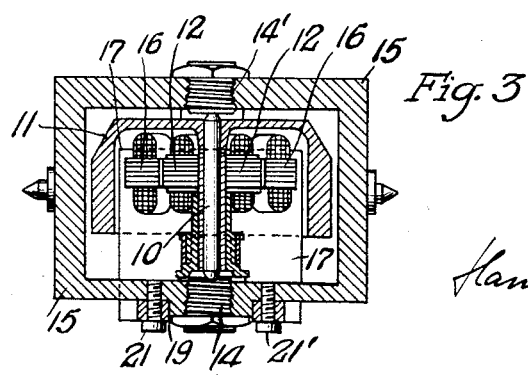
Fig. 3 is a section view taken on line 3—3, in Fig. 2.

With reference to the drawing, the improved gyroscope includes a rotor structure formed of an open end cylindrical flywheel 11, an armature consisting of cores 12 and coils 12' with collectors 13 for the coils, and a shaft 10, on which the respective parts are secured. Suitable brushes (not shown) are fixed on the integral rotor bearing frame or ring 15 and contact the collectors 13. The shaft 10 of the rotor is situated between the bearings 14 and 14' which are secured into position in oppositely disposed threaded portions of the rotor supporting frame 15.

A portion of the stator frame 17 extends within the open end of the flywheel 11, such portion being ring-shaped in form and being adapted to provide a mounting on its interior surface for a field magnet structure 16, 16', which is situated in a spaced concentric axial relation to the armature. A mounting portion 18 of the stator frame is also preferably ring-shaped in form and is situated in spaced parallel relation with the portion of the frame in which the field structure is mounted by an interconnecting semi-circular spacing portion of the integral frame. The part 18 of the stator frame has a bore 19 adapted to fit upon a machined centering stub portion 20 on the outer surface of the rotor bearing frame 15. Two screws are provided for securing the stator frame 17 to the rotor bearing frame 15, the machined surfaces of the portion 22 of the rotor frame 15 and the portion 21' of the stator frame thereby being brought into joined relation.

The ring-shaped portion of the stator frame 17, extending to a determined position between the bearings 14 and 14' of the rotor supporting frame, is provided with a circumferential channel or groove 23 in which the field magnet core 16 is mounted, the same being concentrically arranged and coaxial with the armature cores 12 and the shaft 10. Suitable insulating material (not shown) is located between the stator frame and field magnet structure. Axial displacement of the field magnet structure may be prevented by utilizing a suitable beading on the portion of the stator frame designated at 17'.

Because of the spacing portion of the stator frame and the coaxial arrangement of the spaced ring portions of the frame, the field magnet structure is situated in a correct position with regard to the armature with which it is associated. Also no difficulty is presented in machining the outer surface of the integral rotor bearing frame to enable the stator frame to be mounted thereon.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What is claimed is:

1. An electrically driven gyroscope in which the rotor structure includes a shaft, situated between the spaced bearings of a rotor supporting frame, on which an armature and flywheel are arranged, having a stator frame, a portion of which is ring-shaped and adapted to provide an internal mounting for a field magnet structure associated with the armature of the rotor, a spacing portion of the stator frame by means of which the field magnet structure is situated in a desired position, between the bearings of the rotor supporting frame, in spaced concentric axial relation to the armature, and an end mounting portion of the stator frame by which the same is fitted to a machined surface on the rotor supporting frame.

2. An electrically driven gyroscope in which the rotor structure includes a shaft, situated between the spaced bearings of an integral rotor supporting frame, on which an armature and an open end cylindrical flywheel are arranged, having a stator frame, a portion of which is ring-shaped and adapted to provide an internal mounting for a field magnet structure associated with the armature of the rotor, a spacing portion of the stator frame by means of which the field magnet structure is situated in a desired position, between the bearings of the integral rotor supporting frame, in spaced concentric axial relation to the armature, and within the open end of the cylindrical flywheel, and an end mounting portion of the stator frame formed in the shape of a ring, the bore of which is adapted to fit on a machined outer surface of the rotor supporting frame.

3. An electrically driven gyroscope in which the rotor structure includes a shaft, situated between the spaced bearings of an integral rotor supporting frame, on which an armature and an open end cylindrical flywheel are arranged, having a stator frame providing a ring-shaped portion having an internal circumferential groove by which a field magnet structure is mounted therein, a spacing portion of the stator frame by means of which the field magnet structure is situated in a desired position, between the bearings of the integral rotor supporting frame, in spaced concentric relation to the armature, and within the open end of the cylindrical flywheel, and an end mounting portion of the stator frame formed in the shape of a ring, the bore of which is adapted to fit on a machined outer surface of the rotor supporting frame.

HANS SCHUCHARDT.